US00RE39507E

(19) United States
(12) Reissued Patent
Hazama

(10) Patent Number: US RE39,507 E
(45) Date of Reissued Patent: Mar. 13, 2007

(54) FUEL SUPPLY SYSTEM

(75) Inventor: Tadashi Hazama, Chita-gun (JP)

(73) Assignee: Denso Corporation (JP)

(21) Appl. No.: 11/024,374

(22) Filed: Dec. 29, 2004

Related U.S. Patent Documents

Reissue of:
(64) Patent No.: 6,520,161
Issued: Feb. 18, 2003
Appl. No.: 09/882,045
Filed: Jun. 18, 2001

(30) Foreign Application Priority Data

Jun. 30, 2000 (JP) ..... 2000-198550

(51) Int. Cl.
*F02M 37/04* (2006.01)

(52) U.S. Cl. ..... 123/509; 123/510; 137/572
(58) Field of Classification Search ..... 123/497, 123/509, 510, 514, 516; 137/571–576
See application file for complete search history.

(56) References Cited

U.S. PATENT DOCUMENTS 4,397,333 A 8/1983 Liba et al. ..... 137/574
4,842,006 A * 6/1989 Scheuerenbrand et al. .. 137/574
5,070,849 A * 12/1991 Rich et al. ..... 123/509
5,769,061 A * 6/1998 Nagata et al. ..... 123/509
6,273,131 B1 8/2001 Kleppner ..... 037/565.22

FOREIGN PATENT DOCUMENTS

JP 63-180322 11/1988
JP 2-173352 7/1990
JP 11-125163 5/1999

* cited by examiner

*Primary Examiner*—Tony M. Argenbright
(74) *Attorney, Agent, or Firm*—Nixon & Vanderhye PC

(57) ABSTRACT

The Fuel supply system reduces fuel quantity initially supplied and ineffective residual quantity of fuel. A throat in the shape of a passage is provided at a bottom portion of a sub-tank that supplies fuel from the fuel tank to the interior of the sub-tank by a jet pump. The throat has a suction port communicating with the exterior of the sub-tank and a supply port communicating with the interior of the sub-tank. The throat is inclined with respect to a bottom surface of the tank so that the height of the throat increases gradually from the suction port toward the supply port. The sub-tank has a check valve for opening and closing the supply port. This check valve prevents the fuel in the sub-tank from flowing out to the exterior of the sub-tank through the throat and becomes substantially vertical during valve closing.

2 Claims, 4 Drawing Sheets

FUEL SUPPLY SYSTEM

Matter enclosed in heavy brackets [ ] appears in the original patent but forms no part of this reissue specification; matter printed in italics indicates the additions made by reissue.

CROSS-REFERENCE TO RELATED APPLICATION

The present invention is related to Japanese patent application No. 2000-198550, filed Jun. 30, 2000; the contents of which are incorporated herein by reference.

FIELD OF THE INVENTION

The present invention relates to a fuel supply system having a fuel pump in a sub-tank, and more particularly to a fuel supply system provided with a jet pump for supplying a fuel from the exterior of a sub-tank to the interior thereof.

RELATED ART

Fuel supply systems are provided with a sub-tank in a fuel tank. Fuel pumps in the sub-tank have heretofore been known. Such fuel supply systems include a fuel supply system provided with a jet pump for supplying fuel from the exterior of the sub-tank to the interior thereof. The jet pump has a nozzle adapted to eject fuel into a throat provided in a bottom portion of the sub-tank. The fuel ejected from this nozzle is supplied from the throat to the interior of the sub-tank, and the fuel in the exterior of the sub-tank is sucked into the throat by utilizing a negative pressure occurring in the throat, the fuel sucked into the throat being supplied to the interior of the sub-tank.

The sub-tank is provided therein with a check valve for preventing the fuel in the sub-tank from flowing to the exterior thereof through the throat. In recent years, there has been a demand that the quality of fuel initially supplied on a vehicle assembly line or temporarily supplied when gasoline is low, be reduced. In order to reduce the quantity of fuel initially supplied, it is necessary that a check valve be opened during a low fuel level. In this case, the check valve may be put in a substantially vertically extending condition during valve closing so that a valve opening pressure due to the weight of the check valve itself becomes low. However, a seal seat surface of the check valve must be secured on a circumferential edge portion of an outlet of a throat. Therefore, in order to put the check valve in a substantially vertically extending condition during valve closing, it is necessary that the outlet of the throat be raised at least by a height corresponding to the height of the seal seat surface from a bottom surface of a tank.

In the case of such fuel supply system of a related art design in which the throat is disposed horizontally with respect to the bottom surface of the tank, an inlet of the throat must also be raised. This causes an ineffective residual quantity of fuel in the fuel tank which cannot be sucked up by a jet pump.

When the throat is lowered to the bottom surface of the tank to reduce the ineffective residual quantity of fuel, a seal seat surface of the check valve 110 can be secured on the circumferential edge portion of the outlet of the throat 100 by inclining the same outlet as shown in FIG. 6. However, since a valve opening pressure due to the weight of the check valve 110 itself increases in this case, fuel level increases in the fuel tank at which the check valve 110 can be opened.

SUMMARY

The present invention has been made in view of the above-mentioned drawbacks, and provides fuel supply system capable of reducing the quantity of fuel initially supplied and any ineffective residual quantity of fuel.

According to an aspect of the present invention, the fuel supply system has a throat provided in a bottom portion of a sub-tank so that the throat inclines with respect to a bottom surface of the sub-tank. The height of the throat increases gradually from a suction port thereof toward a supply port thereof. A plane of an opening of the supply port extends substantially vertically.

Accordingly, a seal seat surface for a check valve can be secured on a circumferential edge portion of the opening of the supply port provided in a position higher than the suction port, so that the check valve can be set substantially vertical during valve closing. This prevents a valve opening pressure due to the weight of the check valve itself from increasing. Therefore, the check valve can be opened at a low fuel level, and the quantity of fuel initially supplied into fuel tank can be reduced.

Since the throat is inclined with respect to the bottom surface of the sub-tank, the suction port thereof can be lowered to the same bottom surface. This enables the ineffective residual quantity of fuel in the fuel tank, which cannot be sucked up by a jet pump, to be reduced.

According to another aspect of the present invention, the fuel supply system has a throat provided in a bottom portion of a sub-tank so that the throat inclines with respect to a bottom surface of the sub-tank. The height of the throat increases gradually from a suction port thereof toward a supply port thereof. A plane of an opening of the supply port crosses the axial direction of the throat substantially at right angles.

According to this structure, a seal seat surface for a check valve can be secured on a circumferential edge portion of the supply port provided in a position higher than the suction port, and the check valve can be set substantially vertical during valve closing by setting an angle of inclination of the throat to such a level that permits the seal seat surface to be secured. This can prevent a valve opening pressure due to the weight of the check valve itself from increasing. Therefore, the check valve can be opened at a low fuel level, and the quantity of the fuel initially supplied to the interior of fuel tank can be reduced. Since the throat is inclined with respect to the bottom surface of the sub-tank, the suction port can be lowered to the same bottom surface. This enables the ineffective residual quantity of the fuel in the fuel tank which cannot be sucked up by a jet pump to be reduced.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein:

The fuel supply system according to the present invention will now be described on the basis of the drawings. FIG. 1A is a drawing showing the interior of a sub-tank taken from the upper side thereof, and FIG. 1B a sectional view of a throat provided in the sub-tank.

Figure 1A:
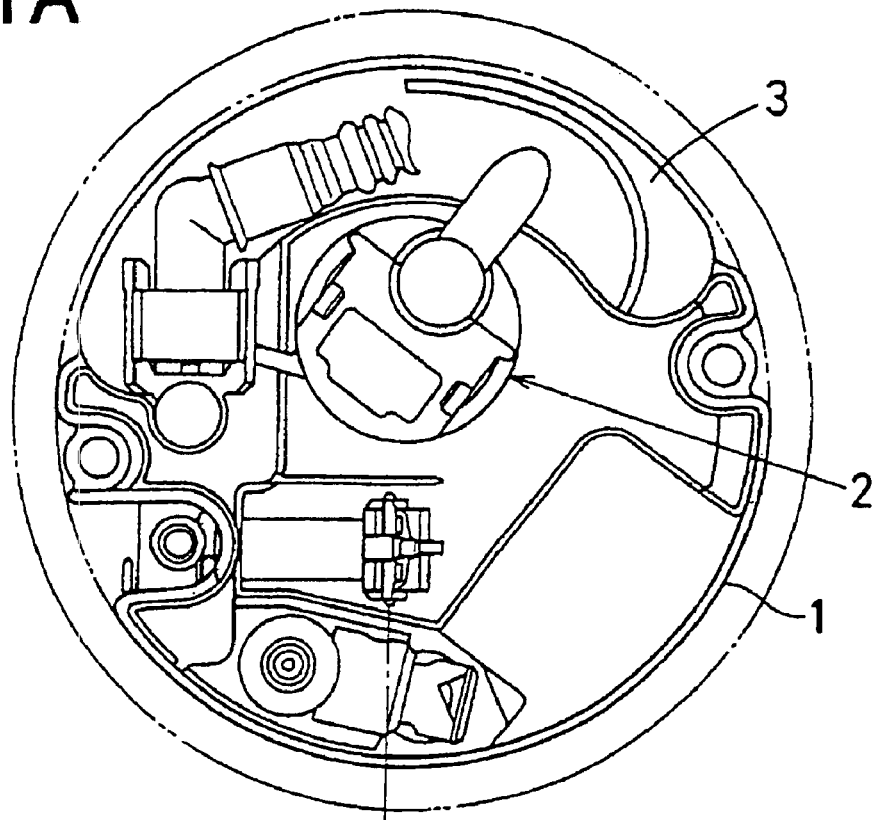
FIG. 1A is a top view showing the interior of a sub-tank according to the invention.

In the fuel system of this embodiment, a sub-tank 1, fuel pump 2 and fuel filter 3 which are held in the sub-tank 1, and a pressure regulator 4 and a jet pump 5 (refer to FIG. 3) which are provided on the outer side of the sub-tank 1 are modularized. The resultant product is held in fuel tank 6 and supported therein via a flange 7 (refer to FIG. 2).

Figure 2:
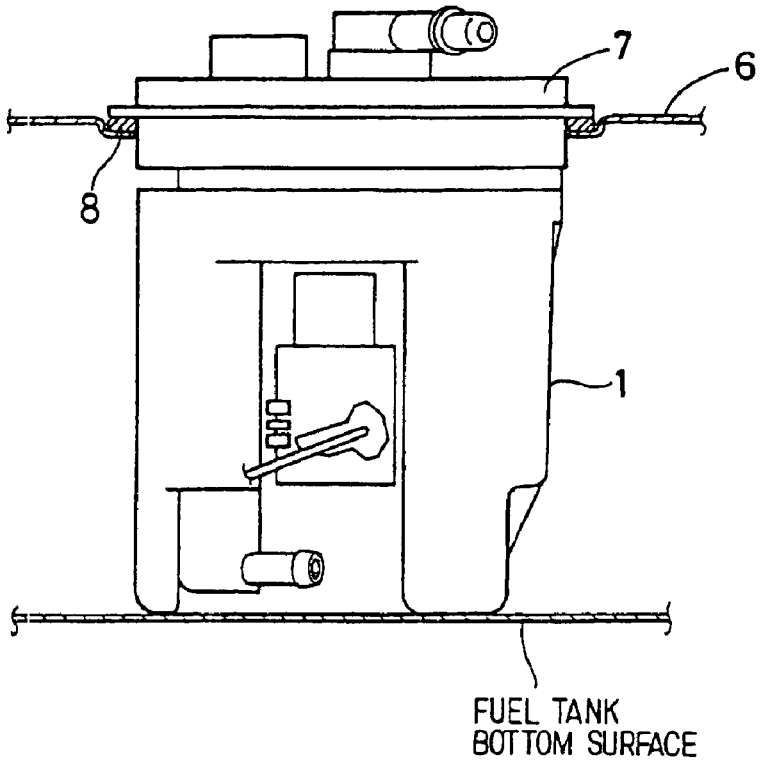
FIG. 2 is a sectional view showing a fuel supply system fixed in a fuel tank according to the invention.
Figure 4:
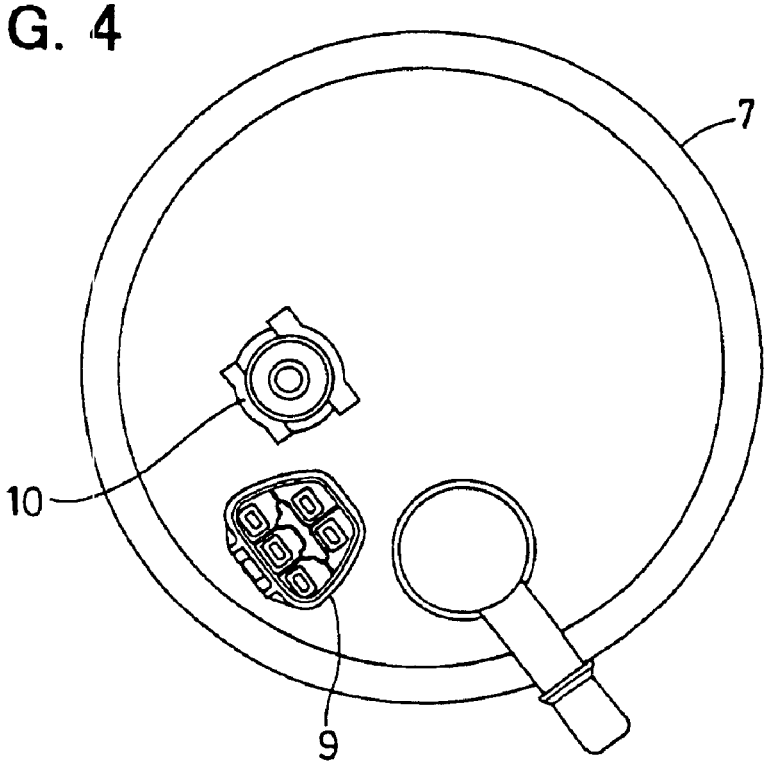
FIG. 4 is a top view of a flange according to the invention.

As shown in FIG. 2, the flange 7 is fixed to an opening, which is provided for inserting modularized sub-tanks into the fuel tank 6, via a packing 8, and the opening is thereby closed air-tight. The flange 7 is provided (refer to FIG. 4) with an electric connector 9 for supplying a power source current to the fuel pump 2, and fuel port 10 for use in supplying fuel to an engine.

Figure 1B:
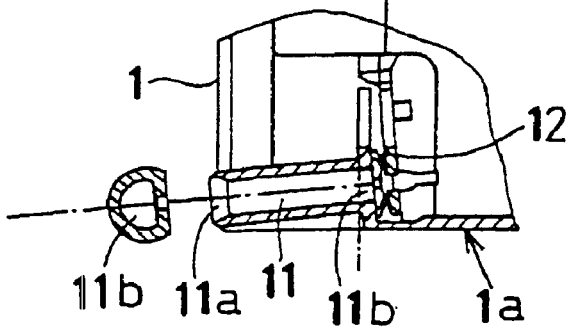
FIG. 1B is a sectional view of a throat according to the invention.
Figure 5:
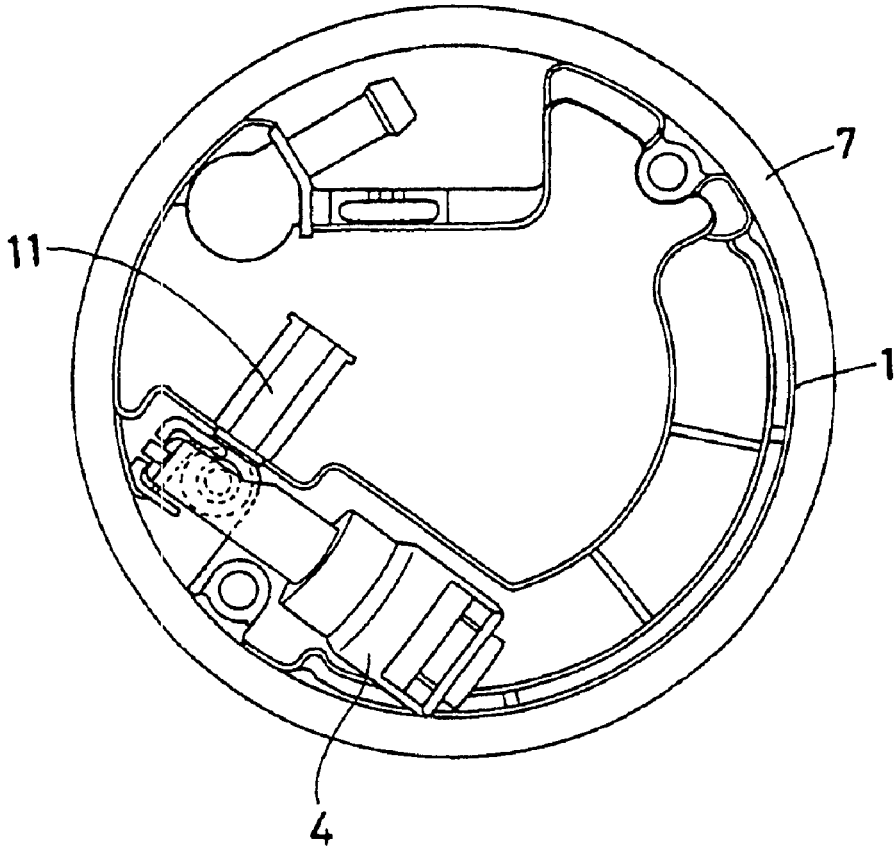
FIG. 5 is a plan view of the fuel supply system from the side of a bottom surface of the sub-tank.
Figure 6:
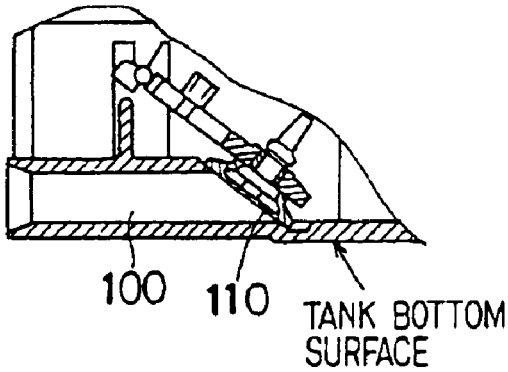
FIG. 6 is a sectional view of the throat.

The sub-tank 1 is a resin molded product formed to a substantially cylindrical shape (refers to FIGS. 1 and 5) and having a bottom surface. FIG. 5 is a plan view of the fuel supply system taken from the side of a bottom surface of the sub-tank 1. The sub-tank 1 is provided with a passage type throat 11 in a bottom portion thereof as shown in FIG. 1B. This throat 11 is a passage for supplying fuel in the fuel tank 6 to the interior of the sub-tank 1 by a jet pump 5 which will be described below. One end of the throat 11 is opened as a suction port 11a to the outside, and the other end thereof as a supply port 11b into the interior of the sub-tank 1. This throat 11 is provided incliningly with respect to the bottom surface 1a of the sub-tank 1 so that the height of the throat 11 increases gradually from the suction port 11a toward the supply port 11b.

The sub-tank 1 is provided therein with a check valve 12 for opening and closing the supply port 11b of the throat 11. This check valve 12 prevents the fuel in the sub-tank 1 from flowing to the outside of the sub-tank 1 through the throat 11. The check valve 12 is capable of opening the supply port 11b, owing to an inflow pressure of the fuel supplied by the jet pump 5, and closing the supply port 11b owing to the weight of the check valve 12 itself when the jet pump 5 is not operated (when the fuel pump 2 is stopped). The check valve 12 is formed so that the check valve 12 is put in a substantially vertically extending condition (refer to FIG. 1B) during valve closing (in the condition in which the check valve 12 closes the supply port 11b) to prevent the valve opening pressure due to the weight of the check valve 12 itself from increasing.

When the fuel pump 2 receives an electric current, it sucks the fuel from the sub-tank 1 via a suction filter (not shown) and sends it under pressure to the fuel filter 3 through fuel passage 13 which will be described below. The fuel filter 3 removes extraneous matter from the fuel sent under pressure from the fuel pump 2 by filtering, and extends accurately so as to surround an outer circumference of the fuel pump 2 as shown in FIG. 1.

Figure 3:
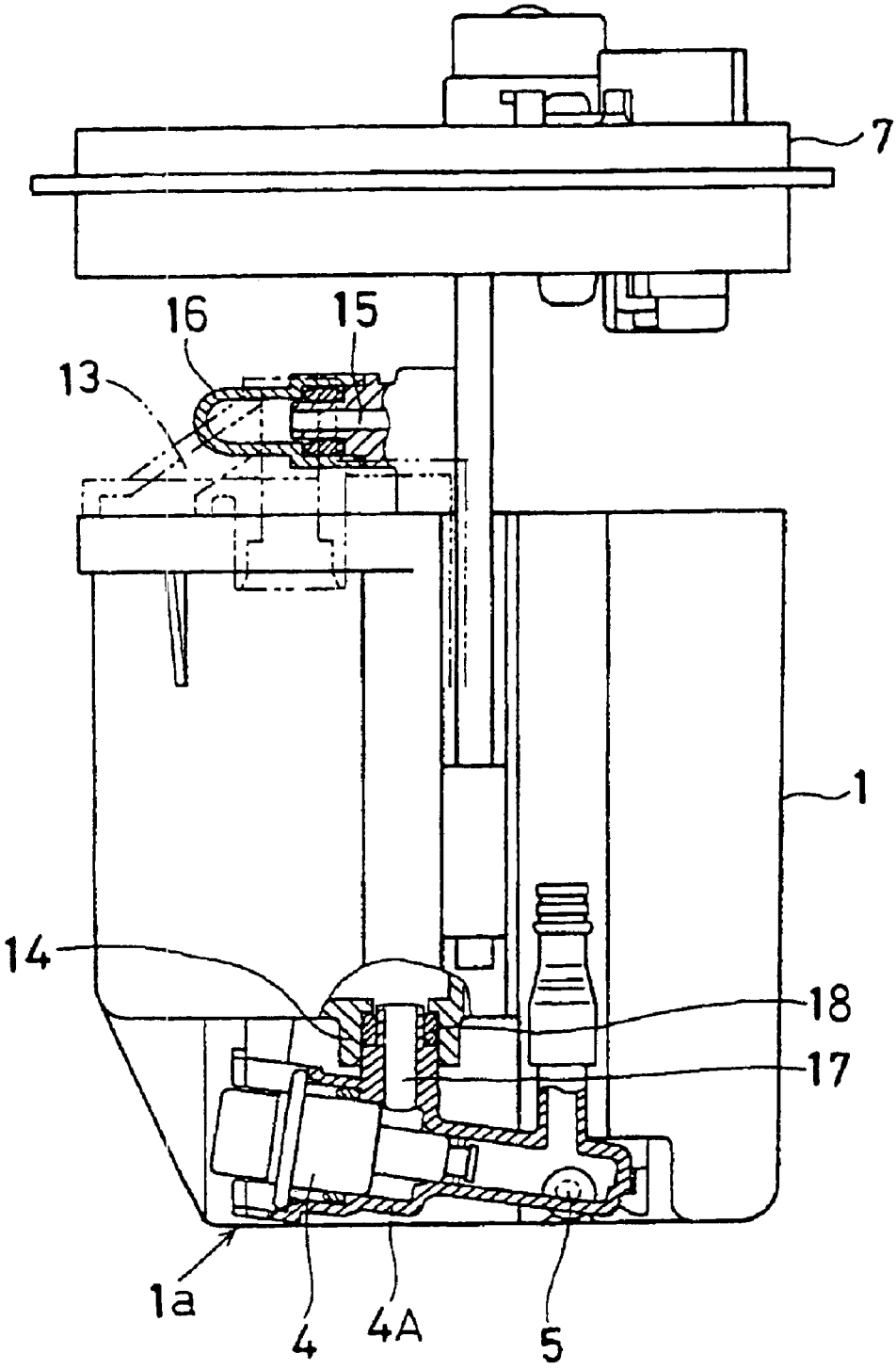
FIG. 3 is a side view of the fuel supply system according to the invention.

A bottom surface of a case of the fuel filter 13 is provided with a connecting port 14 for connecting the pressure regulator 4 thereto. As shown in FIG. 3, a cover for the case of the fuel filter 3 is provided with the fuel passage 13 for introducing fuel discharged from the fuel pump 2 into the fuel filter 3, and a discharge port 15 from which the fuel supplied to an engine is discharged. This discharge port 15 is joined to the fuel port 10, which is provided in the flange 7, via a bellows type connecting pipe 16.

The pressure regulator 4 is adapted to regulate fuel pressure, and is provided in a bottom portion of the sub-tank 1 as shown in FIGS. 3 and 5. A suction port 17 provided in a case 4A of the pressure regulator 4 is connected air-tightly to the connecting port 14, which is provided in the bottom surface of the case of the fuel filter 3, via an O-ring 18. The fuel, the pressure of which has been regulated by the pressure regulator 4, is supplied to the discharge port 15 provided in the cover for the case of the fuel filter 3 through an inside-tank passage (not shown) provided in a vertically extending state in the interior of the sub-tank 1. The jet pump 5 is a nozzle for ejecting the fuel at a high speed toward the suction port 11a provided in the sub-tank 1. The jet pump 5 is provided in a case 4A of the pressure regulator 4 as shown in FIG. 3.

The operation of the fuel supply system will now be described. The fuel pump 2 sucks fuel from the sub-tank 1 via the suction filter, subject to the sucked fuel to a pressure increasing operation, and discharge the resultant fuel therefrom. The discharged fuel flows into the fuel filter 3 through the fuel passage 13, and extraneous matter is removed while the fuel passes through the fuel filter 3. The pressure of the fuel filtrated by the fuel filter 3 is regulated by the pressure regulator 4, and divided into fuel flowing into the inside-tank passage and an excess fuel flowing into the case 4A of the pressure regulator 4.

The fuel which has been subjected to pressure regulation in the pressure regulator 4, and which has flowed into the inside-tank passage, flows to the discharge port 15, connecting pipe 16 and fuel port 10 in the mentioned order. The fuel is then supplied from the fuel port 10 to an engine through a force feed path (not shown).

The excess fuel which has flowed into the case 4A of the pressure regulator 4 is ejected at a high speed from the jet pump 5 (nozzle) toward the suction port 11a of the sub-tank 1. During this time, the interior of the throat 11 becomes vacuum due to a jet of fuel flowing at a high speed into the suction port 11a. Due to this negative pressure, the fuel in the exterior of the sub-tank 1 is sucked from the suction port 11a, and opens the check valve 12, the fuel being then supplied to the interior of the sub-tank 1.

In the fuel supply system in this embodiment, the throat 11 provided in the bottom portion of the sub-tank 1 is formed incliningly with respect to the bottom surface of the sub-tank 1 so that the height of the throat 11 increases gradually from the suction port 11a toward the supply port 11b. According to this structure, a seal seat surface for the check valve 12 can be secured on the circumferential edge portion of the opening of the supply port 11b provided in a position higher than the suction port 11a. Therefore, when the plane of the opening of the supply port 11b is set substantially vertical, the check valve 12 can be set substantially vertical during valve closing. Since this can prevent an increase in the valve opening pressure ascribed to the weight of the check valve 12 itself, the check valve 12 can be opened at a low fuel level. This enables the quantity of fuel initially supplied on an assembling line of vehicles or the quantity of fuel temporarily supplied when gasoline is short to be reduced.

Since the throat 11 is inclined with respect to the bottom surface 1a of the tank, the suction port 11a can be lowered to the tank bottom surface 1a as the check valve 12 is disposed in a substantially vertically extending state during valve closing. This enables an ineffective residual quantity of the fuel in the fuel tank which cannot be sucked up by the jet pump 5 to be reduced.

Moreover, since the check valve 12 closes the supply port 11b of the throat 11 when the fuel pump 2 is stopped, the fuel stored in the sub-tank 1 is prevented from flowing to the outside of the sub-tank 1 through the throat 11. As a result, for example, even when the vehicle is turned, or parked on a slope to cause the fuel in the fuel tank 6 to be put aside, so that the fuel in the exterior of the sub-tank 1 becomes unable to be supplied by the jet pump 5 to the interior thereof, the fuel which has theretofore stored in the sub-tank 1 can be supplied to the engine.

While the above-described embodiments refer to examples of usage of the present invention, it is understood that the present invention may be applied to other usage, modifications and variations of the same, and is not limited to the disclosure provided herein.

What is claimed is:

1. Fuel supply system comprising:

a sub-tank positioned in fuel tank;

a fuel pump positioned in the sub-tank, said fuel pump adapted to suck fuel from the sub-tank and discharge fuel from the sub-tank;

a throat provided in a bottom portion of the sub-tank, said throat opened at one end thereof as a suction port to an exterior of the sub-tank, said throat open at another end as a supply port to the interior of the sub-tank;

a jet pump having a nozzle portion opposed to the suction port, wherein fuel is ejected from the nozzle portion into the interior of the throat, the fuel in the exterior of the sub-tank being thereby sucked from the suction port and supplied to the interior of the sub-tank; and a check valve provided in the sub-tank, said check valve closing the supply port with [only] weight of the check valve, said check valve adapted to prevent the fuel in the sub-tank from flowing out to an exterior of the sub-tank through the throat;

the throat positioned inclininglyy with respect to a bottom surface of the sub-tank so that a height of the throat increases gradually from the suction port toward the supply port with a plane of an opening of the supply port extending substantially vertically.

2. Fuel supply system comprising:

a sub-tank positioned in fuel tank;

fuel pump positioned in the sub-tank, said fuel pump sucking fuel from the sub-tank and discharging resultant fuel from the sub-tank;

a throat provided in a bottom portion of the sub-tank, said throat open at one end as a suction port to an exterior of the sub-tank, said throat open at another end as a supply port to an interior of the sub-tank;

a jet pump having a nozzle portion opposite the suction port, fuel being ejected from the nozzle portion into an interior of the throat, fuel exterior of the sub-tank being thereby sucked from the suction port and supplied to the interior of the sub-tank; and a check valve provided in the sub-tank, said check valve closing the supply port by [only] weight of the check valve, said check valve preventing fuel in the sub-tank from flowing to the exterior of the sub-tank through the throat; and the throat inclined with respect to a bottom surface of the sub-tank so that a height of the throat increases gradually from the suction port toward the supply port with a plane of an opening of the supply port extending so as to cross an axial direction of the throat at substantially right angles.

* * * * *